US012580446B2

(12) United States Patent
Eichinger et al.

(10) Patent No.: US 12,580,446 B2
(45) Date of Patent: Mar. 17, 2026

(54) ELECTRIC MACHINE

(71) Applicant: AUDI AG, Ingolstadt (DE)

(72) Inventors: Benjamin Eichinger, Winkelhaid (DE);
Daniel Häckl, Painten (DE)

(73) Assignee: AUDI AG, Ingolstadt (DE)

( * ) Notice: Subject to any disclaimer, the term of this
patent is extended or adjusted under 35
U.S.C. 154(b) by 288 days.

(21) Appl. No.: 18/318,562

(22) Filed: May 16, 2023

(65) Prior Publication Data

US 2023/0378846 A1    Nov. 23, 2023

(30) Foreign Application Priority Data

May 19, 2022    (DE) ..................... 10 2022 112 556.4

(51) Int. Cl.
H02K 5/24 (2006.01)
H02K 5/20 (2006.01)
H02K 9/19 (2006.01)

(52) U.S. Cl.
CPC ............... H02K 5/24 (2013.01); H02K 5/203
(2021.01); H02K 9/19 (2013.01)

(58) Field of Classification Search
CPC ............ H02K 5/203; H02K 5/24; H02K 9/19;
H02K 2209/00; H02K 9/193
See application file for complete search history.

(56) References Cited

U.S. PATENT DOCUMENTS 6,969,937 B1    11/2005 Schuering
2013/0127267 A1 *   5/2013 Fick ....................... H02K 41/03
310/12.18

2013/0200745 A1     8/2013 Knapp
2019/0085556 A1 *   3/2019 Keller ................... E04B 1/7061
2020/0375262 A1 *  12/2020 Aboabdo ................. H02K 1/02
2023/0163662 A1 *   5/2023 Houser ................... H02K 9/19
310/54

FOREIGN PATENT DOCUMENTS

DE          19914021 A1    12/2000
DE       102013211408 A1    12/2014

OTHER PUBLICATIONS

Translation of DE-102013211408-A1, Maier C, Dec. 31, 2014
(Year: 2014).*
Office Action, dated Mar. 14, 2023, for German Patent Application
No. 10 2022 112 556.4 (5 pages).

* cited by examiner

*Primary Examiner* — Christopher M Koehler
*Assistant Examiner* — Ethan Nguyen Vo
(74) *Attorney, Agent, or Firm* — Seed Intellectual
Property Law Group LLP

(57)    ABSTRACT

An electric machine is provided including a stator, which is
contained in a cooling jacket surrounding the stator about a
periphery thereof, which cooling jacket is contained in a
housing, wherein a plurality of outwardly protruding webs
are provided on an outside of the cooling jacket, projecting
in a direction of an inner wall of the housing, while between
the webs and the inner wall there is provided a material
which increases in volume to have an enlarged state at least
during operation of the electric machine, closing a gap
between each of the respective webs and the inner wall when
in the enlarged state.

11 Claims, 2 Drawing Sheets

ELECTRIC MACHINE

BACKGROUND

Technical Field

Embodiments of the present disclosure relate to an electric machine, comprising a stator, which is contained in a cooling jacket surrounding it about its periphery, wherein the cooling jacket is contained in a housing, wherein multiple outwardly protruding webs are provided on the outside of the cooling jacket, projecting in the direction of the inner wall of the housing.

Description of the Related Art

An electric machine usually comprises a stator as well as a rotor rotating relative to the stator, between which an air gap is formed, across which an electromagnetic field is formed. A typical design of such a machine has an exterior cylindrical stator and a rotor situated inside the cylindrical stator. The stator itself is contained in a cylindrical cooling jacket, surrounding it about its periphery, while the cooling jacket sits on the stator, usually with form fit and/or force fit, so that a firm connection results. The cooling jacket in turn is received in an at least internally cylindrical housing, and the cooling jacket is usually connected to the housing by form fit and/or force fit at its axial ends. It serves for cooling the stator, which becomes heated during operation. For this purpose, multiple outwardly protruding webs are provided on the outside of the cooling jacket, extending in the direction of the cylindrical inner wall of the housing, so that a duct structure is formed in this way, through which a cooling agent such as cooling water can flow. Between the webs or the top sides of the webs and the inner wall of the cooling jacket, there is usually a gap allowing for an easier installation, having a gap width significantly less than 1 mm, for example around 0.1 mm, that is, the housing is almost self-supporting in the entire region where the webs are situated opposite it and there is no contact with the cooling jacket.

In operation of the machine, secondary forces can be formed in addition to the forced producing the actual torque, and these secondary forces may excite machine structures which are capable of vibrating, resulting in annoying solid-borne or air-borne sound. Thus, intense local vibrations may occur on the housing, and these vibrations may be introduced as solid-borne sound into bearing locations, or emitted as air-borne sound. In order to reduce this problem, the stiffness of the housing can be increased, but this involves an increasing of the wall thickness of the housing and thus a greater material component, which has a detrimental effect, especially on the weight, but also on the manufacturing costs. It is also conceivable to put additional stiffening ribs or the like in place on the housing, having similar detrimental effects. Alternatively, it is also conceivable to eliminate the gap between the webs of the cooling jacket and the housing and to realize in its place a firm press fit of the cooling jacket in the housing, which is assured in all temperature ranges during the machine operation. This can only be realized by a corresponding press fit, which can only be formed by greatly heating the housing shortly before installing the stator with the cooling jacket, so that the material expands, after which the stator with the cooling jacket is pushed in and positioned, and the housing is then shrunk onto the cooling jacket during the cooldown. This also involves great expense in the context of the installation.

BRIEF SUMMARY

Embodiments of the present invention provide a machine in which the formation of disruptive vibrations is reduced.

In some embodiments, an electric machine is provided wherein between the webs and the inner wall there is provided a material which increases its volume at least during the operation of the electric machine, closing a gap between the respective web and the inner wall in the enlarged state.

Some embodiments propose placing a material in the gap originally present by virtue of the installation process between the top side of the webs and the inner wall of the housing, which is capable of increasing its volume and in this way to bridge, or close, the gap. Thus, the material is able to produce a contact between the webs at the cooling jacket side and the housing, at least during operation of the electric machine, so that the housing and the cooling jacket are firmly coupled together not only in the area of the cooling jacket ends, but also in the area of the webs, and the housing is no longer self-supporting across this long region in which the webs are provided at the cooling jacket side. This greatly reduces or even largely eliminates the ability of the housing to vibrate, so that the formation of vibrations in this region is greatly reduced, if not entirely eliminated. In this way, the problem of unwanted sound production can be easily corrected, without the need for corresponding strengthening means on the housing, such as a significant increase in the wall thickness or the formation of stiffening ribs or the like. Instead, by a deliberate closure of the gap which is ultimately one of the causes of sound propagation, since there is no contact here between the cooling jacket and the housing, and consequently there is a longer stretch of housing capable of vibrating, the propagation of sound is reduced or prevented.

The material able to increase its volume closes the gap at least when the electric machine is in operation. In some embodiments, the material once having increased its volume initially and closed the gap will retain this state, so that the gap remains permanently closed, i.e., over the entire service life of the electric machine. The material is applied such that a narrow gap still exists during the installation process, so that the cooling jacket can be installed in the housing without problem. Only after the installation is finished is the volume increase initiated, which can occur in various ways, as shall be further discussed below, so that the respective gap is bridged over and closed and the remanent firm contacting is provided. Yet even if the material changes its volume in reversible manner and contracts once more, for example, when the machine is not operated, and once again opens the respective gap, there is the benefit that in event of a necessary disassembly of the stator from the housing the arrangement of stator and cooling jacket can be pulled out once more, since there is no longer any connection of the webs to the housing.

The material can increase its volume, for example, in dependence on its temperature. During the course of the installation, the material generally has room temperature. It is present in its original form or size, i.e., not enlarged, so that a corresponding gap is produced, allowing an easy installation. After the end of the installation, for example during a test run, there occurs a corresponding temperature increase, which also acts on the material, and this increases its volume, for example, upon reaching a threshold temperature, and closes the gap, and the material may also retain this enlarged form even when the machine cools down once again. In the case of reversibly changing material, the volume increase occurs with each new commencement of operation and thus concomitant heating of the cooling jacket, and therefore also of the material. That is, the volume increase is initiated under temperature control.

In some embodiments, the material increases its volume when it is wetted with a fluid, i.e., when it comes into contact with a fluid. Depending on the form of the material, this may involve various fluids which initiate the volume increase. For example, it is conceivable that the cooling ducts forming after installation are flushed with a solvent or similar agent bringing about a swelling of the material, so that there occurs a remanent volume increase. In some embodiments, the fluid initiating the volume increase, i.e., the swelling fluid, is the actual coolant circulating through the cooling jacket, such as cooling water. That is, in the case of this technique initiating the volume increase, the material increases its volume upon contact with a coolant, such as water, flowing through cooling ducts formed by the webs between the cooling jacket and the housing. This embodiment is advisable since the volume increase and thus the respective closure of the gap sets in automatically when the electric machine is placed in normal operation, i.e., when the prescribed coolant flows through and cools the machine, so that no other fluid need be used to bring about the swelling of the material.

Regarding the arrangement of the material in the initial state, i.e., before or during the installation, various possibilities are conceivable. In some embodiments, the material can be placed only on the top sides of the webs. That is, the material is only applied locally where the gap is formed, which is to be closed by the material. In other embodiments, the material may be placed entirely on the inner wall of the housing. The inner wall is consequently covered with the material for the most part, or at least in the area where the webs are positioned after the installation, and the material then increases its volume slightly by swelling or under temperature control over its entire surface, so that the corresponding gap is closed, yet the material is also slightly enlarged in areas situated between the webs. Since the volume increase of the material occurs only to the extent of closing the narrow gap of, for example, around 0.1 mm, the material thus is not excessively increased in its volume, and the volume increase of the material fraction located between the webs does not notably affect the flow cross section of the cooling ducts formed between the webs.

The webs themselves can run in a ring about the periphery of the outside, so that annular cooling ducts are produced. Alternatively, the webs can also run in the longitudinal direction of the cooling jacket, so that oblong cooling ducts are produced.

The material itself is applied, such as glued, advisedly in the form of a band, to the top sides of the webs or the inner wall. The use of such a band is expedient, since it can be easily applied either at the web side or the inner wall side. The application of a corresponding coating or the like is also conceivable.

The thickness of the material, as described, in the non-enlarged state is advisedly such that a gap remains between the material and the inner wall or the top side of the web, allowing for the installation. This gap should have a width between 0.05 and 1.0 mm, preferably being in the lower range of the interval, such as around 0.1 to 0.2 mm. Such a gap can be closed without problem by the material increasing its volume under temperature control or by swelling.

As described herein, it is advantageous for the material to maintain its volume forever after a onetime volume increase, whether under temperature control or control by swelling, so that a permanent gap closure is produced. However, it is also conceivable for the material to also change its volume reversibly, that is, it increases when the machine is started and during a slowly resulting temperature increase and shrinks slightly once again upon cooldown, or it swells up at the start of the operation and the start of the coolant flow, and shrinks once more at the end of the coolant flow, or when the coolant is drained for maintenance purposes and the residual moisture is expelled, so that the gaps form once again and the stator with the cooling jacket can be easily drawn out from the housing.

The material itself must be able to increase its volume slightly, and this volume increase can advisedly be initiated deliberately. A temperature controlled volume increase is conceivable, as described, or one with the aid of a wetting fluid. Suitable materials are corresponding plastics or materials based on plastics or a cellulose-containing material, for example, such as a cellulose-containing material bound in a plastic. In particular, polymers with polar groups such as polyamides like PA6 or PA66 or polymethylmethacrylate have a tendency to take up water, for example, and are thus hydrophilic. Thanks to this controllable water uptake, the corresponding volume expansion occurs and is utilized specifically. Besides the polyamides or polymethylmethacrylate mentioned as examples, thermoplastic elastomers (TPE) as hydrophilic materials are well suited to the purpose described herein. The plastics can also be fiber-reinforced, e.g., with glass fibers, which can be mixed in with the plastic matrix, which is in the form of a band, as described for example. Cellulose-containing material, i.e., material based on wood or plant fibers, also swells up under the influence of moisture. That is, the applied material consists of such cellulose-containing material or comprises such a cellulose-containing material, for example, being held in shape by a slight plastic binder fraction, and this cellulose-containing material, i.e., the wood or plant fibers or the like, swells up upon contact with the cooling water, for example, and closes the gap.

BRIEF DESCRIPTION OF THE SEVERAL VIEWS OF THE DRAWINGS

Further benefits and details will emerge from the following described embodiments as well as the drawings.

DETAILED DESCRIPTION

Figure 1:
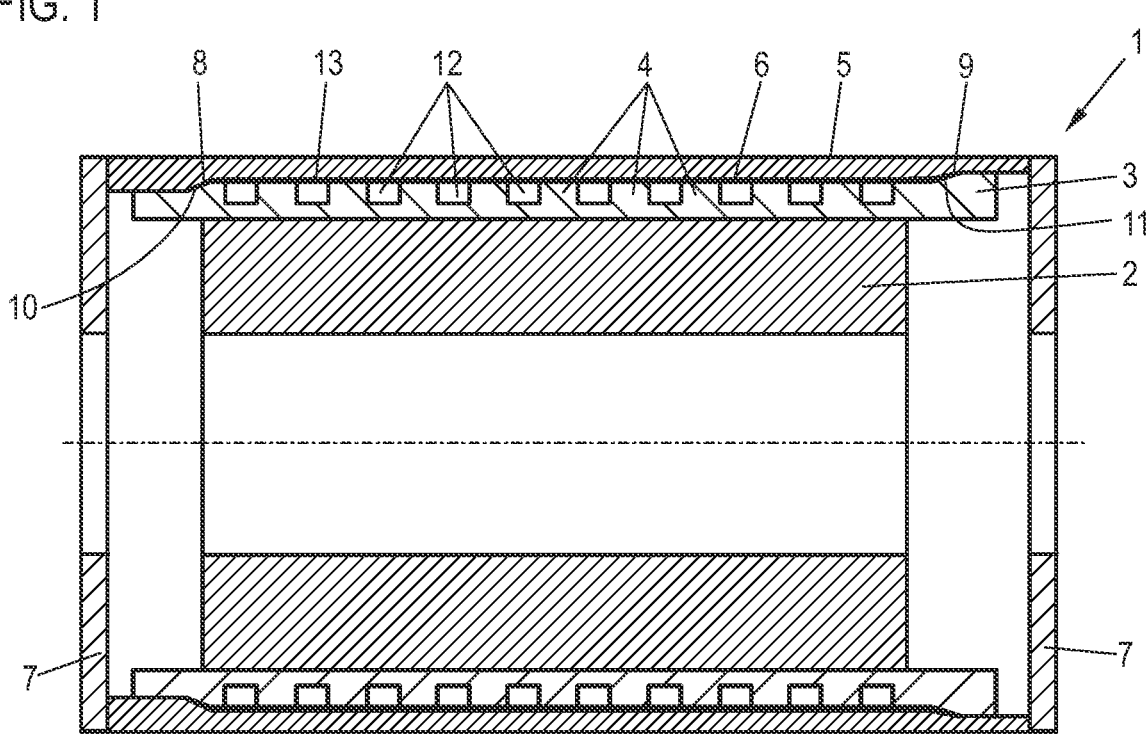
FIG. 1 shows a schematic diagram of an electric machine, showing the basic components in a longitudinal cross section.

FIG. 1 shows a schematic diagram of an electric machine 1 having a cylindrical stator 2, provided on the outside with a cooling jacket 3. The stator 2 is, for example, received by a press fit in the cylindrical cooling jacket 3.

On the outside of the cooling jacket 3 there are provided multiple webs 4, projecting radially outward, which encircle the cooling jacket 3 in a ring in the circumferential direction. The cooling jacket 3 in turn is contained in a housing 5, having at least one cylindrical inner wall 6, and it is closed axially by two bearing plates 7. Through these bearing plates 7 runs a bearing shaft of a rotor, not otherwise shown here, which is arranged inside the stator 2 and can turn relative to it, as is rather well known.

The cylindrical housing 5 has two axial end stops 8, 9, against which lies the cooling jacket 3, introduced from one side, by corresponding axial end stops 10, 11, the cooling jacket 3 being connected by force fit and/or form fit to the housing 5 in these regions, i.e., its axial ends. The cooling jacket 3 as well as the housing 5 and the bearing plates 7 are made of metal.

As described, multiple encircling and radially outwardly projecting webs 4 are provided on the cooling jacket 3, being enclosed by the housing 5. Each time a coolant duct 12 is formed between two webs, being closed radially on the outside by the housing 5, and through these coolant ducts 12 there flows a coolant, usually cooling water, in order to cool the stator 2, which becomes heated during operation.

Figure 2:
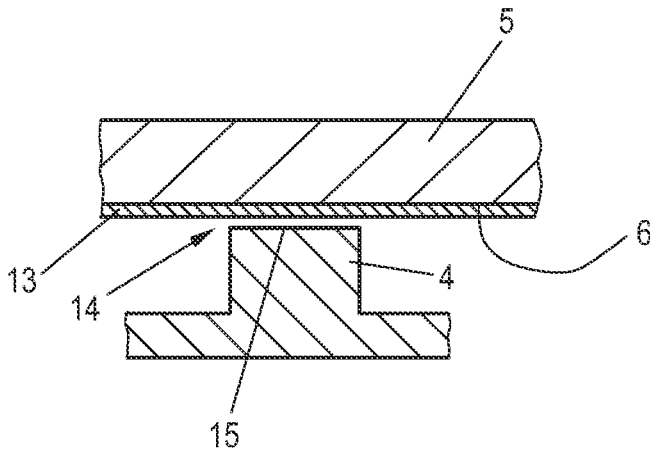
FIG. 2 shows an enlarged cutout of the machine from FIG. 1 showing a portion of the cooling jacket plus the web and the housing, the material arranged on the inner wall in the non-enlarged state.

In the installation process, a narrow gap 14 exists between the top side of each web 4 and the inner wall 6 of the housing 5, that is, no contact occurs there, so that the cooling jacket 3 with the stator 2 can be installed correspondingly easily in the housing 5. In order to close the existing installation gap after the installation, a material 13 which has deliberately increased its volume is applied to the inner wall 6 of the housing 5 in the example shown, being glued on in the form of a band, for example. This material 13 is able to increase its volume deliberately in dependence on a corresponding initiating boundary condition and, consequently, to expand radially inward in the direction of the webs 4. In the process of the installation situation as shown in FIG. 2, the material 13 is present in the non-enlarged initial state, so that a narrow gap 14 exists between the top side 15 of the webs 4 and the material 13 provided at the housing side.

Figure 3:
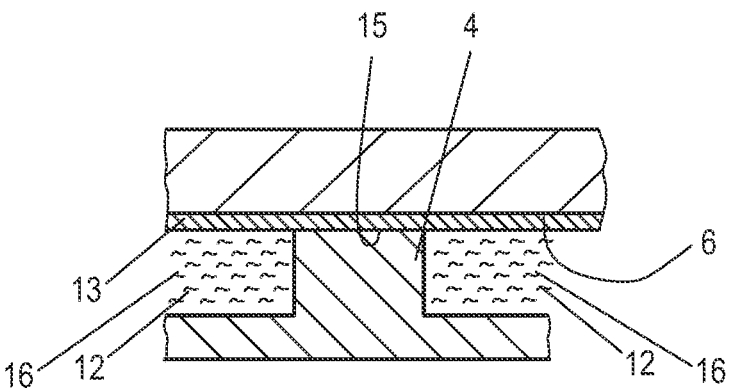
FIG. 3 shows the arrangement of FIG. 2 with material increased in volume and the gap closed.

Now, in order to close the gap 14, the volume increase of the material 13 is initiated. In the present example, the material 13 is hydrophilic, i.e., it has a tendency to take up moisture and thereby increase its volume. As shown by FIG. 3, a fluid 16 flows through the respective duct 12, as indicated there, being for example, cooling water. This fluid 16 wets the material 13, so that it takes up moisture and begins to swell, and therefore increases its volume. This causes it to expand radially inward in the direction of the webs 4 and to lie against the top side 15 of the webs 4, so that the gap 14 is closed. In this way, a firm contact is produced between the webs 4 and the housing 5, so that the housing 5 is connected along its length at all these contact points on the web side to the cooling jacket 3 and thus to the inner stator assembly and the tendency of the housing 5 to vibrate in this region is greatly or entirely prevented.

The swellable material 13 in this case is, for example, a hydrophilic polymer such as a polyamide or a thermoplastic elastomer, which is applied in a thickness depending on the given gap between the top side 15 of the webs 4 and the inner wall 6, such that only still a very narrow gap 14 is formed, which can be bridged over by the swelling of the material 13. The use of other swellable materials, such as cellulose-containing fibers or the like, is also conceivable.

In some embodiments, the volume increase, once it occurs, is remanent, and therefore a permanent gap closure is produced, over the entire service life of the electric machine. This is assured, for example, by using swelling material, inasmuch as a corresponding amount of fluid 16 is always present in the ducts 12 and remains present even when the electric machine is not operating, or there is always a sufficiently high humidity of the air, which ensures the permanent swollen state. If the fluid is drained off and the material dehumidified, it can once again contract and shrink, so that the gap 14 will again open up and remove the contact, allowing an easy disassembly of the stator plus cooling jacket for maintenance purposes.

Figure 4:
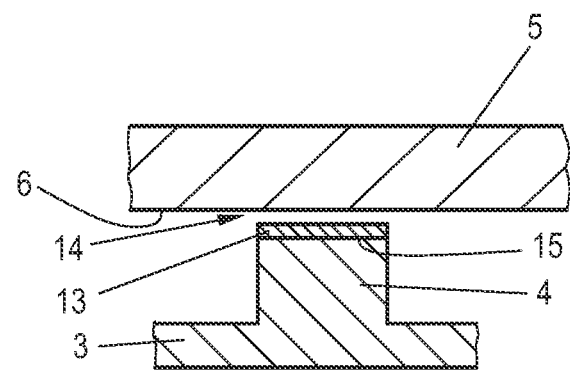
FIG. 4 shows an arrangement per FIG. 2 with material in the initial state, applied to the web.
Figure 5:
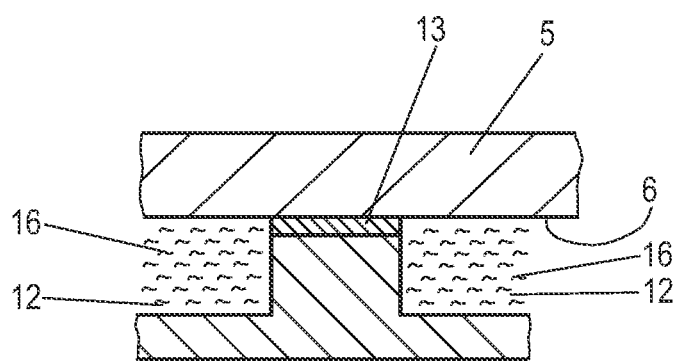
FIG. 5 shows the arrangement of FIG. 4 with material increased in volume and the gap closed.

FIGS. 4 and 5 show a comparable arrangement to FIGS. 2 and 3, namely, a cutout view of the cooling jacket 3 with a web 4 as well as a cutout view of the housing 5 with its inner wall 6. In this embodiment, the material 13 is applied, for example, by a glue-on band, to the top side 15 of each web 4. That is, the material 13 is applied only locally in places where a gap 14 actually exists for installation purposes, and which is to be closed afterwards.

As FIG. 5 shows, here as well the closing of the gap and thus the increasing of the volume of the material 13 occurs by a fluid 16 wetting the material 13, here once again cooling water, which circulates through the ducts 12. As is evident, here as well the material 13 expands due to swelling and closes the gap 14, i.e., it lies tightly against the inner wall 6 of the housing 5, so that a correspondingly firm contact is produced between each web 4 and the housing 5, and thus between the cooling jacket 3 and the housing 5. Since the material is only present in the region of the respective gap 14, but not between the webs 4, there is no reducing of the flow cross section of the ducts 12.

In the schematic diagrams, the respective gap 14 is shown exaggerated in size. In practice, the gap may be in the region of around 0.1 mm, i.e., it has a thickness which can be bridged in any case by the swelling material.

Although a swelling material 13 is shown in the examples, it is also conceivable to use a material which changes its volume in dependence on its temperature. That is, the material 13 becomes enlarged, for example, upon reaching a threshold temperature, which is reached any way in normal operation, the volume increase also being remanent in this case, i.e., the material 13 does not shrink again when it cools down.

German patent application no. 10 2022 112556.4, filed May 19, 2022, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electric machine, comprising:
   a stator, which is contained in a cooling jacket surrounding the stator about a periphery thereof, wherein the cooling jacket is contained in a housing, wherein a plurality of outwardly protruding webs are provided on an outside of the cooling jacket projecting in a direction of an inner wall of the housing, wherein between the plurality of outwardly protruding webs and the inner wall there is provided a material which increases in volume to have an enlarged state at least during operation of the electric machine, closing a gap between each respective one of the plurality of outwardly protruding webs and the inner wall when in the enlarged state, and wherein prior to and during operation of the electric machine at least some of the material which increases in volume is positioned between an outermost surface of the outwardly protruding webs and the inner wall of the housing.

2. The electric machine according to claim 1, wherein the material increases in volume in dependence on a temperature of the material or a fluid wetting the material.

3. The electric machine according to claim 2, wherein the material increases in volume upon contact with a coolant flowing through cooling ducts formed by the plurality of outwardly protruding webs between the cooling jacket and the housing.

4. The electric machine according to claim 1, wherein the material is placed only on top sides of the plurality of outwardly protruding webs, or the material is placed on the inner wall of the housing.

5. The electric machine according to claim 1, wherein the plurality of outwardly protruding webs run in a ring about a periphery of an outside of the cooling jacket, or in a longitudinal direction of the cooling jacket.

6. The electric machine according to claim 4, wherein the material is glued in the form of a band to the top sides of the plurality of outwardly protruding webs or the inner wall of the housing.

7. The electric machine according to claim 1, wherein a thickness of the material in a non-enlarged state is such that a gap is formed between the material and the inner wall of the housing or the top sides of the plurality of outwardly protruding webs.

8. The electric machine according to claim 1, wherein, after the material transitions to the enlarged state, the material retains an enlarged shape permanently.

9. The electric machine according to claim 1, wherein the material is a plastic or a material based on plastic or containing cellulose.

10. The electric machine according to claim 9, wherein the material is a cellulose-containing material bound in a plastic.

11. The electric machine according to claim 7, wherein the gap has a width of 0.05 to 1.0 mm.

\* \* \* \* \*